(12) United States Patent
von Praun

(10) Patent No.: US 8,001,329 B2
(45) Date of Patent: Aug. 16, 2011

(54) SPECULATIVE STREAM SCANNING

(75) Inventor: Christoph von Praun, Munich (DE)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/122,962

(22) Filed: May 19, 2008

(65) Prior Publication Data

US 2009/0287725 A1 Nov. 19, 2009

(51) Int. Cl.
*G06F 13/00* (2006.01)

(52) U.S. Cl. ......... 711/129; 711/173; 714/727; 707/776

(58) Field of Classification Search ................. 707/776; 711/120, 129; 712/13; 714/726–727; 717/119, 717/141–142
See application file for complete search history.

(56) References Cited

U.S. PATENT DOCUMENTS

| | | | |
|---|---|---|---|
| 5,842,208 A * | 11/1998 | Blank et al. ..................... 1/1 |
| 5,915,260 A | 6/1999 | Sokolov |
| 6,009,265 A * | 12/1999 | Huang et al. ..................... 1/1 |
| 6,061,775 A * | 5/2000 | Tran et al. ..................... 712/1 |
| 6,112,198 A * | 8/2000 | Lohman et al. ..................... 1/1 |
| 6,175,909 B1 | 1/2001 | McBride |
| 6,393,549 B1 * | 5/2002 | Tran et al. ..................... 712/204 |
| 6,507,834 B1 * | 1/2003 | Kabra et al. ..................... 707/718 |
| 6,594,651 B2 * | 7/2003 | Kabra et al. ..................... 1/1 |
| 6,604,190 B1 * | 8/2003 | Tran ..................... 712/207 |
| 7,082,558 B2 | 7/2006 | Gupte |
| 7,203,959 B2 | 4/2007 | Nachenberg |
| 7,246,227 B2 * | 7/2007 | Kissel |
| 2003/0187633 A1 * | 10/2003 | Fairweather ..................... 704/9 |
| 2004/0158732 A1 * | 8/2004 | Kissel ..................... 713/200 |
| 2004/0220930 A1 * | 11/2004 | Finlay et al. ..................... 707/7 |
| 2005/0108554 A1 | 5/2005 | Rubin |
| 2005/0120269 A1 | 6/2005 | Larson |
| 2006/0182046 A1 | 8/2006 | Dageville |
| 2006/0218123 A1 * | 9/2006 | Chowdhuri et al. ..................... 707/2 |
| 2006/0235811 A1 * | 10/2006 | Fairweather ..................... 706/12 |
| 2007/0112714 A1 * | 5/2007 | Fairweather ..................... 706/46 |
| 2008/0043750 A1 * | 2/2008 | Keels et al. ..................... 370/395.52 |

* cited by examiner

*Primary Examiner* — Hanh B Thai
(74) *Attorney, Agent, or Firm* — Michael J. Buchenhorner; Derek S. Jennings

(57) ABSTRACT

A system and method for partitioning a data stream into tokens includes steps or acts of: receiving the data stream; setting a partition scanner to a beginning point in the data stream; identifying likely token boundaries in the data stream using the partition scanner; partitioning the data stream according to the likely token boundaries as determined by the partition scanner, wherein each partition of the partitioned data stream bounded by the likely token boundaries comprises a chunk; and passing the chunk to a next available token scanner, one chunk per token scanner, for identifying at least one actual token within each chunk.

15 Claims, 6 Drawing Sheets

SPECULATIVE STREAM SCANNING

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of data stream processing, and more particularly relates to parallel scanning of a character stream through speculative execution.

BACKGROUND OF THE INVENTION

Many data mining and knowledge discovery frameworks rely on sequential scanning of data streams for key word scanning and pattern matching as in, for example, intrusion detection systems and document indexing, such as the Lucene index writer by The Apache Software Foundation.

Scanning is the process of partitioning a stream of fine grain data (referred to as characters in this specification), into tokens, a token being a sequence of characters from the original stream. The component that performs the operation of scanning is called a scanner. The output of a stream scanner is a sequence of tokens, which is input to a downstream component in a stream processing system, e.g. for the purpose of document indexing, data mining, filtering, and other uses. The operation of such a downstream component is orthogonal to the operation of the scanner component and hence we will not elaborate on it further in this disclosure.

A scanner is typically part of a stream processing system as illustrated in FIG. 6, consisting of a scanner 002 and a downstream processing component 004. The scanner 002 receives as input a character or binary data stream 001. The output of the scanner and the input to the downstream processing component is a stream of tokens 003.

The process of scanning is commonly done sequentially: each token is recognized through a finite state machine that processes characters in the order delivered by the stream; moreover, individual tokens are recognized in sequence, i.e., the character following the end of one token being the start of the next token. This sequential method of token recognition can limit the rate at which a stream is processed if the computation required to recognize the token is larger than the rate at which the characters corresponding to the token can be obtained from the input stream. In other words, the sequential computation required for the token recognition can be the limiting factor in the throughput that the overall stream processing system can achieve.

The theory of finite state machines and the construction of scanners for character streams is a well understood problem and has been extensively studied and documented in the literature. A significant shortcoming of known algorithms for sequential scanning is that they operate in a serial manner on the stream and are not parallelized.

Recent technology trends led to steady increases of network stream bandwidth on the one hand and stagnating single-thread computational performance of microprocessors on the other hand. These trends raise a dilemma and demand for methods to accelerate the sequential paradigm of stream scanning.

SUMMARY OF THE INVENTION

Briefly, according to an embodiment of the invention a method for partitioning a data stream into tokens includes steps or acts of receiving the data stream; setting a partition scanner to a beginning point in the data stream; identifying likely token boundaries in the data stream using the partition scanner; partitioning the data stream according to the likely token boundaries as determined by the partition scanner, wherein each partition of the partitioned data stream bounded by the likely token boundaries comprises a chunk; and passing the chunk to a next available of a plurality of token scanners, one chunk per token scanner. A token scanner identifies at least one actual token starting at the first character of its chunk. If the end of the actual token or tokens recognized by the token scanner coincide with the end of the chunk, then the likely token boundary chosen by the partitioning scanner is confirmed, otherwise it is refuted. The method further provides for reporting the actual token to a client for downstream processing.

According to an embodiment of the present invention the order of the chunks is defined by the order of their occurrence in the data stream. The operation of the partitioning scanner can be restarted if a previously identified likely token boundary turns out not to be an actual token boundary. Such restarted operation is triggered by a token scanner, which determines the precise token boundaries and confirms or refutes guesses about token boundaries made by the partitioning. The restart operation advances the partitioning scanner to position in the data stream corresponding to the end of the last token confirmed by a token scanner. The restart operation of the partitioning scanner also restarts operation of all token scanners.

According to another embodiment of the present invention, a data scanner system includes: input comprising a data stream; a partition scanner that receives as input the data stream, identifies likely token boundaries in the data stream, and partitions the input data stream into a plurality of chunks according to the likely token boundaries; and a plurality of token scanners for concurrently processing the plurality of chunks.

A computer readable storage medium includes program instructions for carrying out the method steps as discussed above. The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
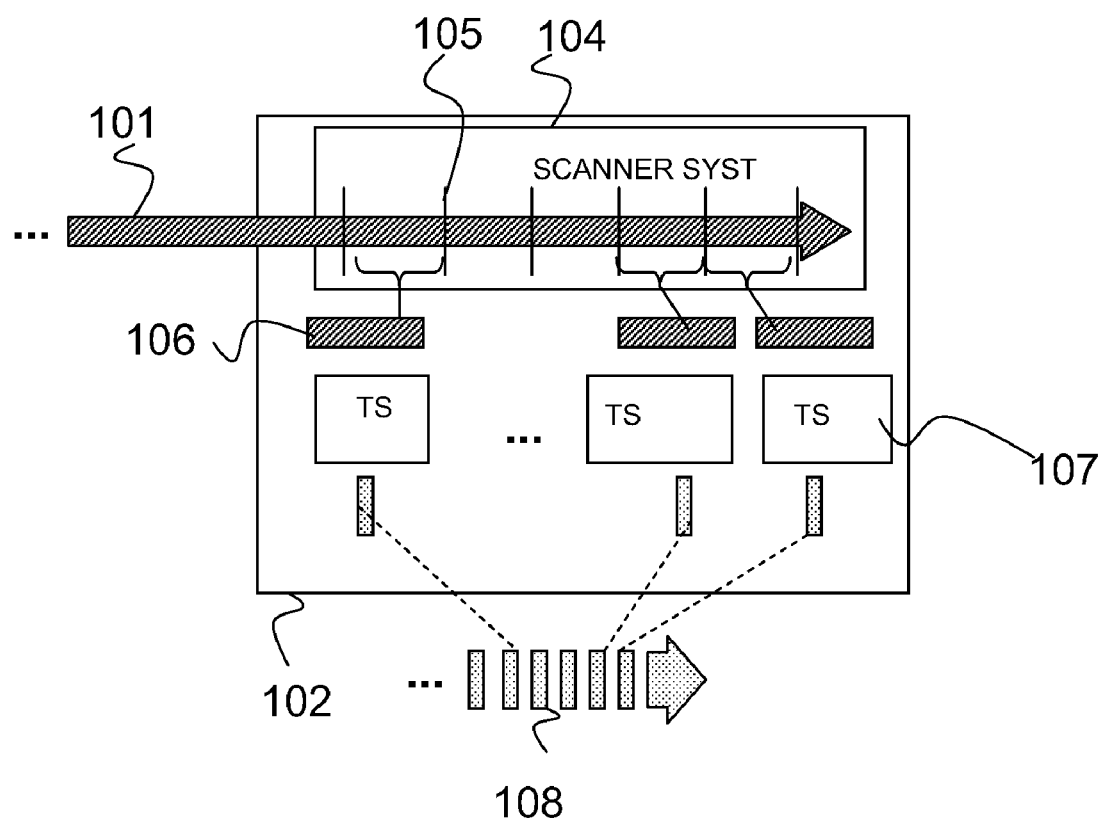
FIG. 1 illustrates the architecture of a stream scanner according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We disclose a novel method to implement the scanner component 002 using speculative stream processing. Speculative stream processing is employed to speed up the process of scanning, which can be a substantial factor in the overall execution time of a knowledge discovery process on multi-core and multiprocessor architectures. The method uses a two-level scan process including one high-level scanner, which we refer to as the partition scanner, and at least one low-level scanner, which we refer to as a token scanner. The method recognizes tokens at several positions in the data stream in parallel.

According to an embodiment of the present invention, an acceleration mechanism for stream scanning is a sequential scanner using a method to partition a data stream into tokens operates (recognizes tokens) at several positions of the stream concurrently where the positions at which speculative threads operate are determined through a partitioning scanner that identifies likely token boundaries. If the speculation is successful in the common case, this scheme achieves to speed up the process of serial scanning through the use of multiple execution units (threads) that operate on different parts of the stream. This embodiment uses known mechanisms to exchange data among threads (non-blocking data structures), and to buffer data from the stream.

Referring now in specific detail to the drawings, and particularly FIG. 1, there is illustrated an overall architecture of the scanner system 102 according to an embodiment of the present invention. The scanner system 102 includes the high-level scanner 104 and multiple token scanners 107. The input to the scanner system 102 is a stream of characters 101. The input stream 101 may include text, audio, image or video data. The output of the scanner system 102 is a stream of tokens 108.

The partition scanner 104 partitions the character input stream 101 according to likely token boundaries 105. We refer to each unit of such partitioning as a "chunk" 106 in this specification. Once a chunk is found, the partition scanner initiates the operation of a token scanner 107 on that chunk 106. The partitioning scanner 104 can be restarted, which means that it starts its process of identifying chunks 106 as of a specified position in the stream 101.

A token scanner 107 operates on one chunk 106 devised by the partitioning scanner. The token scanner 107 identifies one or more actual tokens 108 in the chunk 106. There can be one or more token scanners 107 in the system. A token scanner 107 can operate in speculative or non-speculative mode.

According to an embodiment of the present invention the computation and possible updates of the state of the scanner system 102 that are performed by a speculative token scanner 107 are not observed outside the speculative scanner 107. Mechanisms for speculative execution are, for example thread-level speculation.

Figure 2:
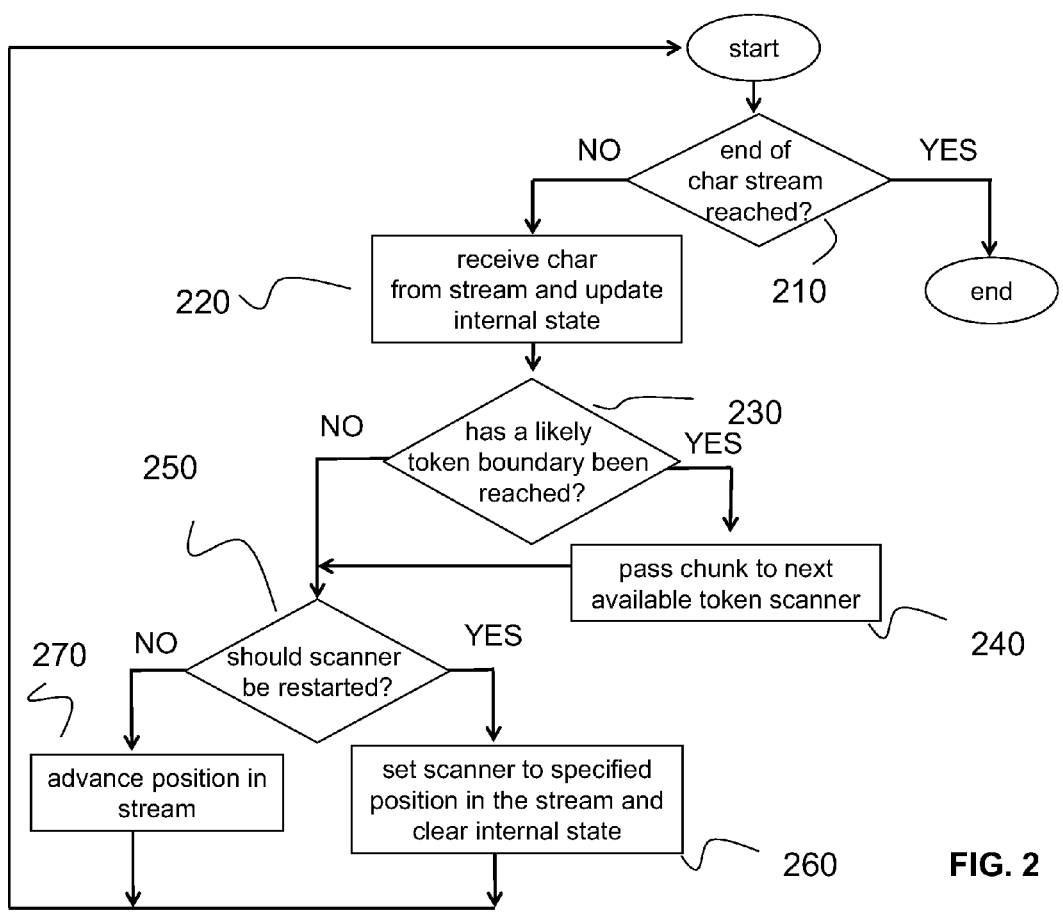
FIG. 2 is a flow chart showing the operation of a partitioning scanner according to another embodiment of the invention.

Referring to FIG. 2 there is shown a flow chart of the operation of the high-level partitioning scanner 104. The partitioning scanner 104 first determines if the end of the character stream 101 has been reached in step 210. If not, in step 220, it receives a character from the stream 101 and updates the internal state of the scanner 104. If the partitioning scanner 104 determines that it has reached a likely token boundary 105 in step 230, then it passes the chunk 106 pertaining to that boundary 105 to the next available token scanner 107 in step 240. Step 240 is one of the key aspects that differentiate present invention from previous methods of sequential stream scanning. Step 240 enables independent processing of a chunk by an available token scanner. The token scanner operates on its assigned chunk in parallel to the partitioning scanner and other token scanners. Operation of an individual token scanner is detailed in FIG. 3 and FIG. 4. All token scanners configured in the system execute in parallel, following individually the logic specified by the flow charts in FIG. 3 and FIG. 4.

If not, then in step 250 the token scanner 107 determines if the high level scanner 104 should be restarted. If so, it restarts the scanner 104 and clears its internal state in step 260. Else, it advances to the next position in the stream 101.

Each one of the token scanners 107 operates on a chunk 106 of the original stream 106. The order of the chunks 106 is defined by the order of their occurrence in the original stream 101, which is partitioned by the partitioning scanner 104. The token scanners 107 are also ordered according to the order of chunks 106 on which they operate. We refer to the least recent chunk 106 reported by the partitioning scanner 104 that is still not tokenized as the head of the stream 101. Subsequent chunks 106 are called successors. We refer to a successor-predecessor relationship among token scanners 107 corresponding to the order of the chunks 106 on which they operate.

Figure 3:
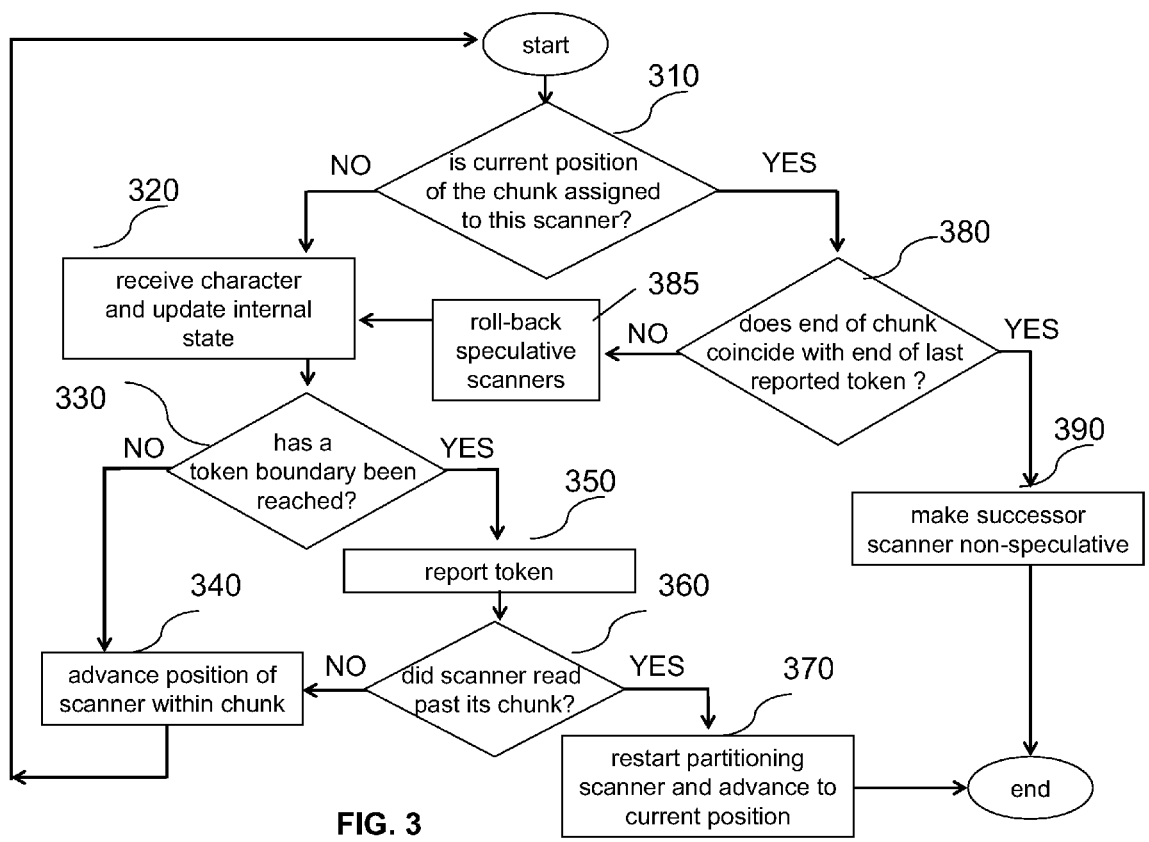
FIG. 3 is a flow chart showing the operation of a non-speculative token scanner.

FIG. 3 shows the operation of the non-speculative token scanner 107. There is exactly one non-speculative token scanner 107, namely the one that operates on the chunk 106 at the current head of the stream 101. The non-speculative token scanner 107 can report tokens 108, once discovered, to clients of the overall scan process. In step 310 the non-speculative token scanner 107 determines if the current position of the chunk 106 is assigned to it.

When a non-speculative token scanner 107 reaches the end of the chunk 106 on which it operates, then one of the following cases apply: If the end of the chunk 106 coincides with the end of the recognized token 108 in step 380, i.e., the guess of token boundary 105 made by the partitioning scanner 104 was confirmed and found to be correct by the token scanner 107, the token 108 is reported, the subsequent scanner 107 transitions from speculative to non-speculative mode in step 390, and the current token scanner 107 terminates.

If the end of the chunk 106 does not coincide with the end of the recognized token 108 as determined in step 380, then the token scanner 107 continues the scanning process using characters from the subsequent chunk 106 until a complete token 108 is recognized; subsequent token scanners 107, which operate in speculative mode, are rolled back in step 385.

Then, when the end of the subsequent token 108 is reached in decision 330, the partitioning scanner 104 reports the token in step 350. It determines at decision 360 if the scanner 104 read past the chunk 106. If the answer is no, then in step 340 it advances the position to the next character in the chunk 106 and the process repeats.

If decision 360 determines that the scanner has read past the chunk 106, in step 370 the partitioning scanner 104 is restarts to its current position at that token boundary 105 in step 370 and the current token scanner 107 terminates.

Token scanners 107 can operate in speculative mode, i.e., they recognize token(s) 108, but do not report them until they become non-speculative. A speculative token scanner 107 transitions from speculative to non-speculative mode when all predecessor token scanners 107 have completed such that the token scanner 107 operates at the head of the stream 101.

Figure 4:
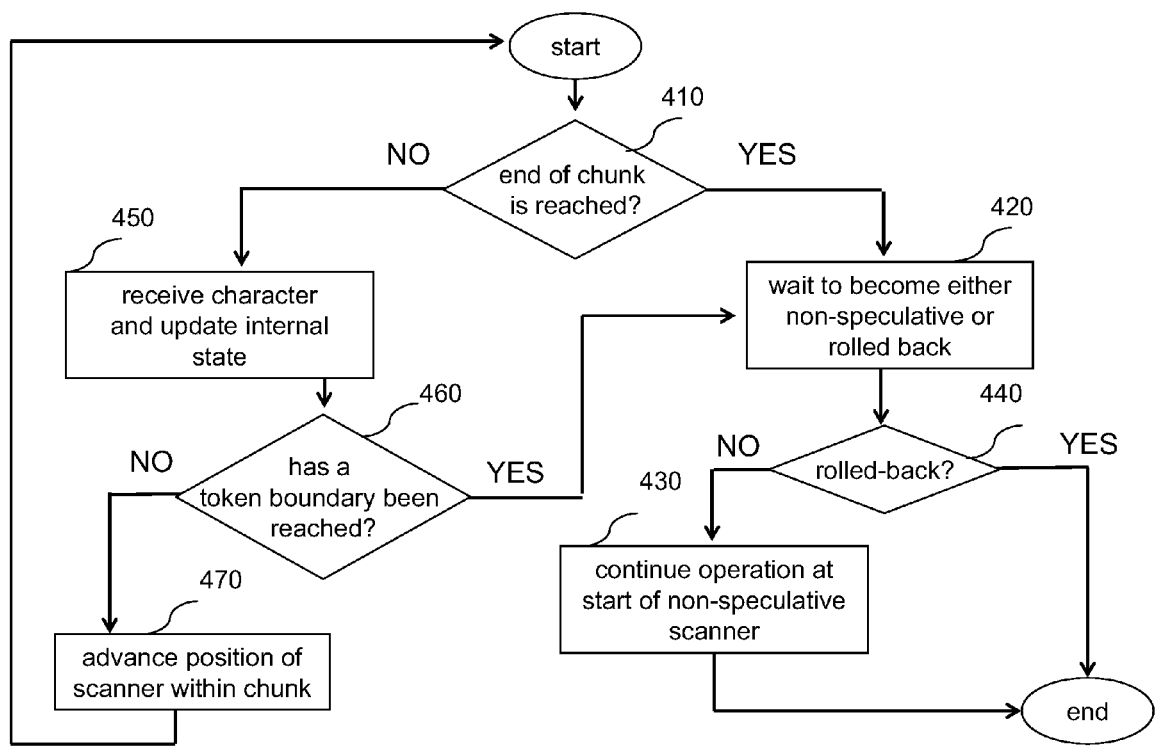
FIG. 4 is a flow chart showing the operation of a speculative token scanner according to another embodiment of the invention.

Referring to FIG. 4, when a speculative token scanner 107 reaches the end of the chunk 106 on which it operates in decision step 410, it waits to become non-speculative or to be rolled back in step 420. In the former case, it continues operation as described in the non-speculative case (FIG. 3) in step 430. If decision point 440 determines that it is rolled back, the current token scanner 107 terminates.

If, at decision point 410 it is determined that the end of the chunk 105 has not been reached, then in step 450 the next character is processed and the internal state of the token scanner 107 is updated. Next, in decision point 460 if it is determined that the token boundary 105 has not been reached, we advance the position of the scanner 107 to the next character within the chunk 106 and the process repeats.

However, if the token boundary 105 has been reached (as determined in 460), we proceed to step 420 where the token scanner 107 waits to become non-speculative or to be rolled back.

The two-level scan process works as follows:

1) The "partitioning scanner" partitions the stream according to 'likely' token boundaries. One unit of such partitioning is called a 'chunk' in this specification.

2) Several "token scanners" operate in parallel on chunks and identify one or more tokens in each chunk. One token scanner, namely the one that operates at the head of the stream, is non-speculative, i.e., it is eligible to report tokens, once discovered, to clients of the scanner. The other token scanners operate in speculative mode, i.e., they recognize token(s) but do not report them until they become non-speculative.

A stream becomes non-speculative if its upstream token scanner has finished processing its chunk and confirmed that the alleged token start determined by the partitioning scanner was an actual token start. If the guess of the partitioning scanner is found to be a wrong, then the results of token scanners that operate on subsequent chunks are squashed, and the partitioning scanner is restarted at the actual token boundary.

Figure 5:
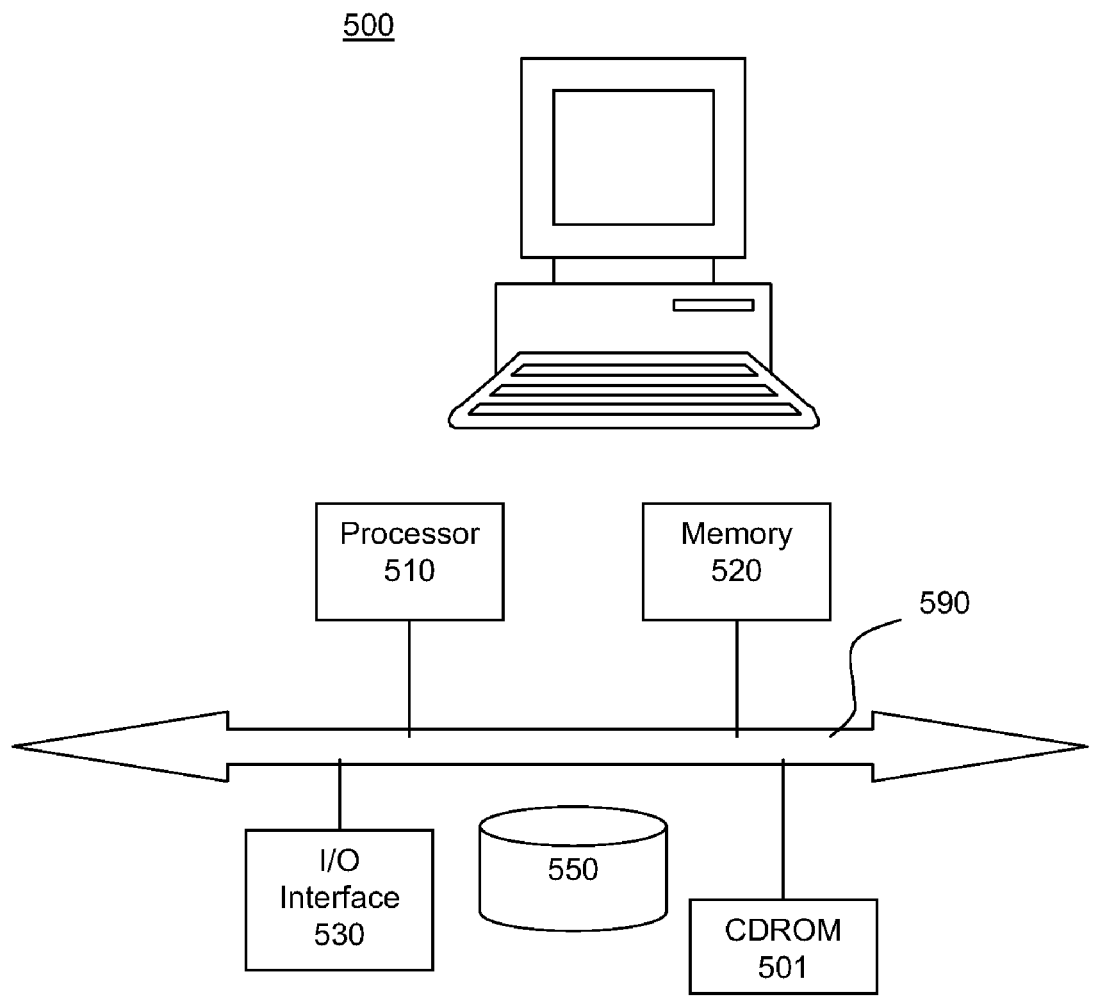
FIG. 5 is a simplified block diagram of a computer programming apparatus configured to operate according to an embodiment of the present invention.
Figure 6:
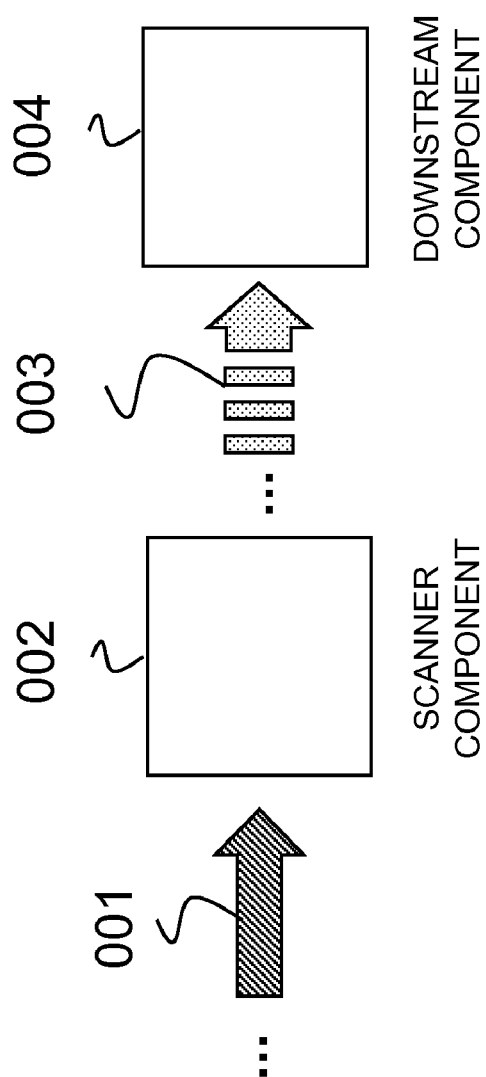
FIG. 6 illustrates the architecture of a stream processing system according to the known art.

Referring to FIG. 5, there is shown a block diagram of an information handling system 500 consistent with an embodiment of the present invention. For purposes of this invention, computer system 500 may represent any type of computer, information processing system or other programmable electronic device, including a client computer, a server computer, a portable computer, an embedded controller, a personal digital assistant, and so on. The computer system 500 may be a stand-alone device or networked into a larger system.

The system 500 could include a number of operators and peripheral devices as shown, including a processor 510, a memory 520, and an input/output (I/O) subsystem 530. The processor 510 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory subcomponents.

The memory 520 represents either a random-access memory or mass storage. It can be volatile or non-volatile. The system 500 can also comprise a magnetic media mass storage device such as a hard disk drive 550.

The I/O subsystem 530 may comprise various end user interfaces such as a display, a keyboard, and a mouse. The I/O subsystem 530 may further comprise a connection to a network such as a local-area network (LAN) or wide-area network (WAN) such as the Internet. Processor and memory components are physically interconnected using a conventional bus architecture. Those skilled in the art will appreciate that other low-level components and connections are required in any practical application of a computer apparatus.

According to an embodiment of the invention, a computer readable medium, such as a CDROM 501 can include program instructions for operating the programmable computer 500 according to the invention.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution.

Examples of media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

According to another embodiment of the invention, a computer readable medium, such as CDROM 501 can include program instructions for operating the programmable computer 500 according to the invention.

According to another embodiment of the invention, a computer readable medium, such as CDROM 501 can include program instructions for operating the programmable computer according to the invention. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

I claim:

1. A method for partitioning a data stream into tokens, the method comprising steps of:
    using an input/output system receiving the data stream;
    using a processor device configured to perform:
        setting a partition scanner to a beginning point in the data stream;
        identifying likely token boundaries in the data stream using the partition scanner;
        partitioning the data stream according to the likely token boundaries as determined by the partition scanner, wherein each partition of the partitioned data stream bounded by the likely token boundaries comprises a chunk;
        passing the chunk to a next available token scanner, one chunk per token scanner, for: identifying at least one actual token within each chunk; and
        reporting the actual token to a client for downstream processing only when the token scanner is determined to be non-speculative.

2. The method of claim 1 wherein an order of the chunks is defined by the order of their occurrence in the data stream.

3. The method of claim 1 wherein the operation of the partitioning scanner further comprises:
    a restart operation that is invoked if a previously identified likely token boundary turns out not to be an actual token boundary;
    the restart operation positions the partitioning scanner to the end of the last actual token boundary in the data stream.

4. The method of claim 3, further comprising:
    squashing results of token scanners; and
    restarting the partition scanner at the actual token boundary.

5. The method of claim 1 wherein the token scanner becomes non-speculative when a preceding token scanner has finished processing its chunk and confirmed that the likely token boundary identified by the partition scanner was an actual token boundary.

6. The method of claim 5 wherein a speculative token scanner is rolled back, the roll back operation undoing the effects of the computation of the token scanner.

7. The method of claim 6 wherein the speculative token scanner transitions from speculative to non-speculative mode when all preceding token scanners have completed such that said speculative token scanner operates at a head of the stream.

8. The method of claim 1 wherein the token scanner operating on the chunk at a head of the data stream is a non-speculative token scanner.

9. The method of claim 1 further comprising a step of buffering data from the data stream.

10. A computer program product embodied on a non-transitory computer readable storage medium and comprising code that, when executed, causes a computer to perform the following:
    receive a data stream;
    set a partition scanner to a beginning point in the data stream;
    identify likely token boundaries in the data stream using the partition scanner;
    partition the data stream according to the likely token boundaries as determined by the partition scanner, wherein each partition of the partitioned data stream bounded by the likely token boundaries comprises a chunk;
    pass the chunk to a next available token scanner, one chunk per token scanner, to identify at least one actual token within each chunk; and
    report the actual token to a client for downstream processing only when the token scanner is determined to be non-speculative.

11. A method for partitioning a data stream into tokens, the method comprising steps of:
    using an input/output system receiving the data stream;
    using a processor device configured to perform:
        setting a partition scanner to a beginning point in the data stream;
        identifying likely token boundaries in the data stream using the partition scanner;
        partitioning the data stream according to the likely token boundaries as determined by the partition scanner, wherein each partition of the partitioned data stream bounded by the likely token boundaries comprises a chunk;
        passing the chunk to a next available token scanner, one chunk per token scanner, to identify at least one actual token within each chunk, wherein the token scanner operating on the chunk at a head of the data stream is a non-speculative token scanner; and
        reporting the actual token to a client for downstream processing.

12. The method of claim 11 wherein an order of the chunks is defined by the order of their occurrence in the data stream.

13. The method of claim 11 wherein the operation of the partitioning scanner further comprises:
    a restart operation that is invoked if a previously identified likely token boundary turns out not to be an actual token boundary; and
    the restart operation positions the partitioning scanner to the end of the last actual token boundary in the data stream.

14. The method of claim 13, further comprising:
    squashing results of token scanners; and
    restarting the partition scanner at the actual token boundary.

15. The method of claim 11 further comprising a step of buffering data from the data stream.

* * * * *